Figure 1:
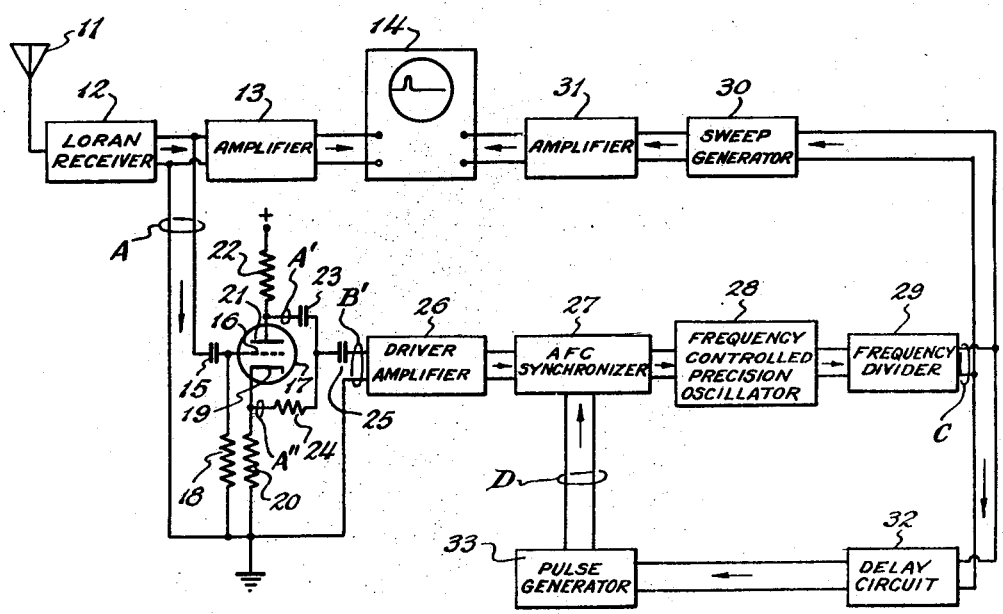

July 19, 1960

R. L. FRANK 2,946,019

PULSE SYNCHRONIZING SYSTEM

Filed Nov. 26, 1954

INVENTOR
ROBERT L. FRANK
BY
B. F. Spencer
AGENT

United States Patent Office 2,946,019
Patented July 19, 1960

2,946,019

PULSE SYNCHRONIZING SYSTEM

Robert Lee Frank, Great Neck, N.Y., assignor to Sperry Rand Corporation, a corporation of Delaware Filed Nov. 26, 1954, Ser. No. 471,170

3 Claims. (Cl. 331—18)

The present invention relates to pulse synchronizing circuits, and in particular to circuits for automatically maintaining a precision timing oscillator synchronized to the leading edges of a series of recurrent pulses.

Patent 2,636,988, assigned to the same assignee as the present invention, describes and claims a pulse synchronizing system for synchronizing an oscillator with a series of recurrent unidirectional pulses. The shape of the unidirectional pulses is transformed by differentiation into bidirectional pulses which are more suitable for synchronization purposes. The zero or crossover position of each of the bidirectional pulses corresponds with the peak of the unidirectional pulses. The output voltage from the oscillator is divided in frequency to obtain short output pulses whose pulse repetition frequency is substantially equal to the frequency of the recurrent unidirectional pulses. The differentiated bidirectional pulses and the short output pulses are supplied to a pulse coincidence circuit which produces an output frequency control voltage varying according to the relative time difference between the zero position of the bidirectional pulses and the short output pulses. The output frequency control voltage adjusts the frequency of the oscillator to maintain the short output pulses synchronized to the crossover or zero position of the bidirectional pulses. The oscillator is synchronized to the peak of the recurrent unidirectional pulses. This type of synchronization system is especially adapted for use with the type of recurrent unidirectional pulses employed in loran.

In the loran navigation system the slave transmitter is located remotely from the master transmitter and is maintained in synchronism with the loran master transmitter by matching the leading edges of the unidirectional detected slave pulses to the leading edges of the received unidirectional detected master pulses. This matching procedure is accomplished manually at the slave transmitter and provides an increase in the accuracy of synchronization as compared to a system for matching the peaks of the unidirectional slave pulses with the peaks of the unidirectional master pulses. The peak of the unidirectional master and slave pulses is susceptible to variations due to differences in transmitter characteristics and to sky wave reflections.

In the manually operated loran receivers, the time difference measurement between master and slave pulses is accomplished by visually matching the magnitudes and the sloping (non-vertical) leading edges of the detected master and slave pulses on the face of a cathode ray tube. A paramount improvement in the accuracy of synchronization and time difference measurement can be achieved in the loran system by providing a method for automatically synchronizing the precision timing oscillator of the loran receiver to a predetermined point on the leading edges of detected master pulses, and measuring the time difference interval between the predetermined point on the leading edges of the detected master pulses and a corresponding point on the leading edges of the detected slave pulses.

Accordingly, the principal object of the present invention is to improve the accuracy of synchronization between the output voltage from a precision oscillator and a series of recurrent pulses having sloping edges.

Another object of the present invention is to provide a simple circuit arrangement for automatically synchronizing the output voltage from a precision oscillator with a predetermined point on the sloping leading edges of a recurrent pulse wave.

Still another object of the invention is to provide an improved method for locating a particular point on the sloping leading edge of each pulse of a recurrent pulse wave.

Yet another object of the invention is to provide a simple circuit arrangement for altering the shape of received loran signals to derive a more suitable pulse wave for synchronizing a precision timing oscillator.

In accordance with the present invention there is introduced an improved pulse synchronizing system for synchronizing the precision timing oscillator of a loran receiver with a modified version of the received loran signals. The loran signals are received and detected in a loran receiver and supplied to a pulse shaping circuit. The pulse shaping circuit produces synthesized bidirectional output pulses by differentiating the applied loran unidirectional pulses and taking the difference between the differentiated pulses and a fixed percentage of original unidirectional loran pulses. The synthesized bidirectional pulses are supplied to a pulse coincidence circuit where their time position is compared with short pulses obtained from the precision timing oscillator. The pulse coincidence circuit produces an output frequency control voltage for adjusting the frequency of the precision timing oscillator to maintain the short pulses from the timing oscillator in coincidence with the zero or crossover position of the synthesized bidirectional loran pulses. The zero or crossover position of the synthesized loran pulses corresponds to a predetermined position on the sloping leading edges of the received loran unidirectional pulses.

Figure 2:
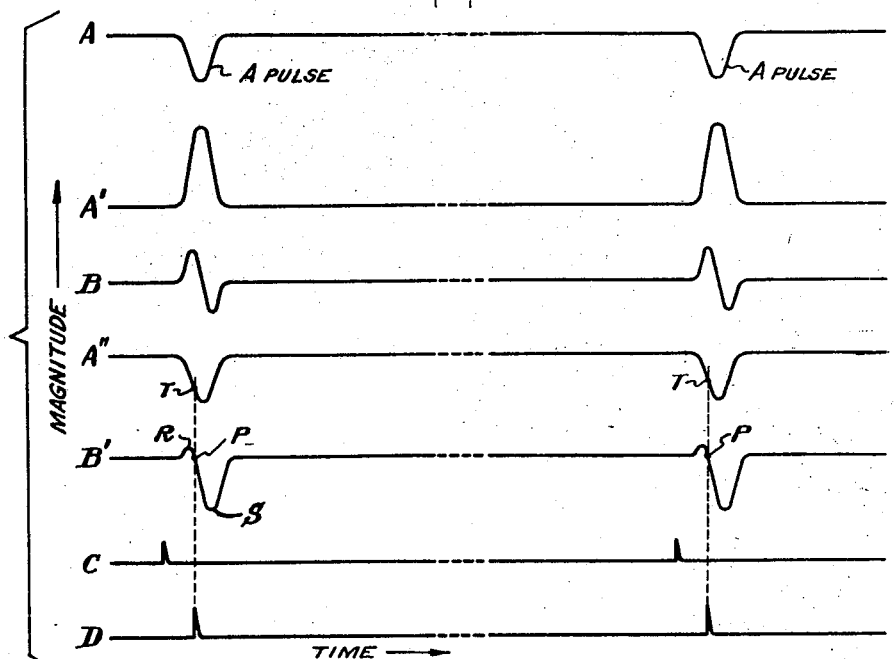

The above objects of and the brief introduction to the present invention will be more fully understood and further objects and advantages will become apparent from a study of the following detailed description in connection with the drawings, wherein, Fig. 1 is a combination block and schematic diagram of the improved pulse synchronizing system of the present invention, and Fig. 2 illustrates waveforms of voltages associated with the synchronizing system of Fig. 1.

Referring to Fig. 1, signals from a loran transmitter are collected by antenna 11 and supplied to the loran receiver 12. The loran receiver may be identical to the receiver of Patent 2,651,033 and identified therein by the same reference numeral 12. Assuming that receiver 12 is responsive solely to signals from a loran master transmitter, for purposes of illustration, the received master or A pulses, illustrated as waveform A in Fig. 2, are amplified by amplifier 13 and supplied to the vertical deflection plates of cathode ray oscilloscope 14. These A pulses are also coupled through condenser 15 to the control grid 16 of triode 17. Grid resistor 18 is coupled between the control grid 16 and ground. Cathode 19 is coupled through cathode resistor 20 to ground. Anode 21 is coupled through load resistor 22 to a source of positive potential.

The loran pulses appearing at the anode 21 are inverted in polarity with respect to the pulses of waveform A of Fig. 2 and these amplified and inverted loran pulses are illustrated as waveform A'. The loran A pulses further appear at cathode 19 and are slightly attenuated as illustrated by the waveform A''. The amplified and inverted loran pulses of waveform A' are differentiated in a simple differentiating circuit consisting of condenser 23 and resistors 20 and 24. These differentiated bidirectional pulses appear across the resistors 20 and 24 as waveform B of Fig. 2. However, since the loran pulses of waveform A'' appear across the cathode resistor 20, these latter pulses are combined with the differentiated bidirectional pulses of waveform B. The resulting output pulse waveform is a synthesized bidirectional pulse wave appearing between the junction of condenser 23 and resistor 24 and ground as illustrated by the waveform B' in Fig. 2. These synthesized pulses are coupled through condenser 25 to the input of driver amplifier 26. The amplified synthesized pulses from the driver amplifier are coupled to one input of an AFC synchronizer or pulse coincidence circuit 27.

The frequency controlled precision oscillator 28 produces an alternating output voltage whose frequency is higher than the repetition frequency of the received loran pulses. This alternating output voltage is divided in frequency by divider 29 to produce the short output pulses of waveform C of Fig. 2, whose pulse repetition frequency is substantially equal to the repetition frequency of the loran pulses. The short output pulses C trigger the sweep generator 30 to produce a sawtooth sweep voltage which is amplified by amplifier 31 and applied to the horizontal deflection plates of the cathode ray oscilloscope 14. The received loran A pulses appear on the face of the cathode ray oscilloscope as shown.

The short output pulses of waveform C are also applied to a delay circuit 32. The delayed output pulses from the delay circuit energize a pulse generator 33 to produce the delayed short pulses of waveform D. These short pulses energize the synchronizer 27 to sample the magnitude of the synthesized bidirectional pulses of waveform B'. If the short pulses of waveform D occur in coincidence with the point R on the waveform B', the synchronizer 27 produces a positive output frequency control voltage which when applied to the frequency controlled precision oscillator 28 will reduce the frequency of the oscillator thereby causing the short pulses to slowly drift to the right with respect to the synthesized bidirectional pulses B'. If the short pulses of waveform D occur in coincidence with point S on waveform B', the synchronizer 27 produces a negative output frequency control voltage which will increase the frequency of the precision oscillator 28, thereby causing the short pulses to slowly drift to the left with respect to the synthesized bidirectional pulses B'. When the short pulses occur in coincidence with the crossover or zero position of waveform B', indicated as point P, the precision oscillator is properly synchronized and the frequency control voltage from synchronizer 27 is reduced to zero.

The point P at the zero position of waveform B' corresponds to a predetermined fixed point T on the leading edge of the loran pulses as shown in the waveform A''. Accordingly, the precision oscillator is synchronized with respect to this predetermined point T on the leading edges of the received loran pulse signals.

Should the gain of the triode tube 17 change due to a change in the applied positive potential coupled through load resistor 22 to the anode 21, or change due to differences in tube types, the magnitude of the amplified and inverted loran pulses A' and the magnitude of the loran pulses A'' will vary together. The difference between the differentiated bidirectional pulses B, derived from the pulses of waveform A', and the pulses of waveform A'' will not produce a change in the position of the point P on the synthesized bidirectional pulses of waveform B'. The point P will remain fixed relative to the leading edge of the loran pulses of waveform A.

The synthesized bidirectional pulses of waveform B' are produced without the introduction of nonlinear elements in the pulse shaping circuit. Therefore, the point P does not shift due to the presence of random noise on the unidirectional loran signals of waveform A.

Other types of reactive networks may be intercoupled between the anode 21 and cathode 19 of triode 17 instead of the simple capacitor-resistor differentiating circuit 23, 20, 24 to produce synthesized bidirectional output pulses. For example, the unidirectional pulses of waveform A' at anode 21 may be delayed in time by a reactive pulse delay line and then combined with the attenuated unidirectional pulses A'' across cathode resistor 20. This combination produces synthesized bidirectional pulses whose waveform is essentially the inversion of waveform B'. Such a synthesized bidirectional pulse waveform may be utilized in the pulse synchronizing system of the present invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A pulse shaping circuit for producing synthesized bidirectional output pulses from applied recurrent unidirectional pulses having sloping edges comprising in combination, a source for producing said unidirectional pulses having said sloping edges, an electron discharge tube having a control electrode, a cathode, and an anode, means connected to said source and to said control electrode for applying said recurrent unidirectional pulses to said control electrode, first impedance means coupled to said anode, second impedance means coupled to said cathode, said electron discharge tube producing an amplified and inverted version of said recurrent unidirectional pulses across said first impedance means and producing an attenuated version of said unidirectional pulses across said second impedance means, differentiating means including a condenser and a resistor coupled in series between said anode and said cathode, said condenser, resistor and second impedance means differentiating the unidirectional pulses across said first impedance means to produce bidirectional pulses, said condenser, resistor and second impedance means further combining said differentiated bidirectional pulses and the unidirectional pulses across said second impedance means for producing synthesized bidirectional output pulses, said synthesized bidirectional output pulses appearing at the junction of said condenser and resistor means.

2. A pulse synchronizing system including a pulse generator, an oscillator coupled to said pulse generator to control the timing of pulses generated by said pulse generator, means for producing asymmetrical bidirectional output pulses each having its zero crossover coincident with a predetermined point upon a sloping portion of a respective unidirectional input pulse; said means comprising a source for producing said unidirectional input pulses having said sloping portion, differentiating means coupled to said source and responsive to said input pulses to produce symmetrical bidirectional pulses each having its zero crossover in coincidence with the peak of a respective one of said unidirectional input pulses, and signal summing means connected to said differentiating means for adding algebraically said unidirectional input pulses and said symmetrical bidirectional pulses; a pulse coincidence circuit connected to receive pulses generated by said pulse generator and said asymmetrical output pulses to produce a control signal having a polarity dependent on the sense of any deviation in repetition frequency between said asymmetrical output pulses and said generated pulses, and means for applying said control signal to said oscillator to adjust the frequency thereof and thereby to maintain said generated pulses in substantial coincidence with said predetermined point on said unidirectional input pulses.

3. Apparatus for producing an asymmetrical bidirectional output pulse with its zero crossover coincident with a predetermined point upon a sloping portion of a unidirectional input pulse, comprising a source for producing said unidirectional input pulse having said sloping portion, differentiating means coupled to said source and responsive to said input pulse to produce a symmetrical bidirectional pulse with its zero crossover in coincidence with the peak of said unidirectional input pulse, and signal summing means connected to said source and to said differentiating means for adding algebraically said unidirectional input pulse and said symmetrical bidirectional pulse, means for inverting one of said input and symmetrical bidirectional pulses before it is added to the other of said input and symmetrical bidirectional pulses, said differentiating means, said signal summing means, and said inverting means comprising an electron discharge device having an anode, a cathode and a control electrode, said control electrode being connected to said source, respective load impedances connected to said anode and said cathode, a condenser and a resistor connected in series with each other between said anode and said cathode, the junction between said resistor and said condenser constituting a terminal for delivering said output pulse.

References Cited in the file of this patent

UNITED STATES PATENTS

| | | |
|---|---|---|
| 2,248,442 | Stocker | July 8, 1941 |
| 2,484,352 | Miller | Oct. 11, 1949 |
| 2,537,589 | Johnson | Jan. 9, 1951 |
| 2,559,144 | Baracket | July 3, 1951 |
| 2,600,185 | Ballard | June 10, 1952 |
| 2,702,853 | Watson | Feb. 22, 1955 |
| 2,708,717 | Holmes et al. | May 17, 1955 |
| 2,761,065 | Robinson | Aug. 28, 1956 |
| 2,856,525 | Lubkin | Oct. 14, 1958 |